United States Patent [19]
Balow et al.

[11] Patent Number: 5,560,295
[45] Date of Patent: Oct. 1, 1996

[54] PRINTING DEVICES FOR A PRINTING PRESS

[75] Inventors: Frank A. Balow, Western Springs; Robert C. Kiamco, Wood Dale, both of Ill.

[73] Assignee: Rockwell International Corporation, El Segundo, Calif.

[21] Appl. No.: 14,284

[22] Filed: Feb. 5, 1993

[51] Int. Cl.$^6$ ..................................................... B41F 13/10
[52] U.S. Cl. .......................... 101/375; 101/216; 492/28; 492/45; 492/60
[58] Field of Search ..................................... 101/216, 212, 101/213, 375, 376, 141, 136, 152, 153, 174, 205, 206, 328, 348, 349, 219; 400/638; 492/19, 28, 45, 60

[56] References Cited

U.S. PATENT DOCUMENTS

| | | | |
|---|---|---|---|
| 1,949,688 | 3/1934 | Kranz | 101/375 |
| 2,460,504 | 2/1949 | Huebner | 101/216 |
| 2,645,997 | 7/1953 | Grede | 101/348 |

FOREIGN PATENT DOCUMENTS

| | | | |
|---|---|---|---|
| 0544374 | 6/1993 | European Pat. Off. | 101/216 |

*Primary Examiner*—Eugene H. Eickholt
*Attorney, Agent, or Firm*—C. B. Patti; H. F. Hamann

[57] ABSTRACT

A printing device (10) for a printing press (12) having a cylinder (14) having at least one journal (16 or 18) extending from an end (20 or 22) of the cylinder (14), and a bearing (30 or 32) on the journal (16 or 18) and having an inner edge (44 or 46) located in the range of 1/16 inches to 1½ inches from the end (20 or 22) of the cylinder (14).

2 Claims, 3 Drawing Sheets

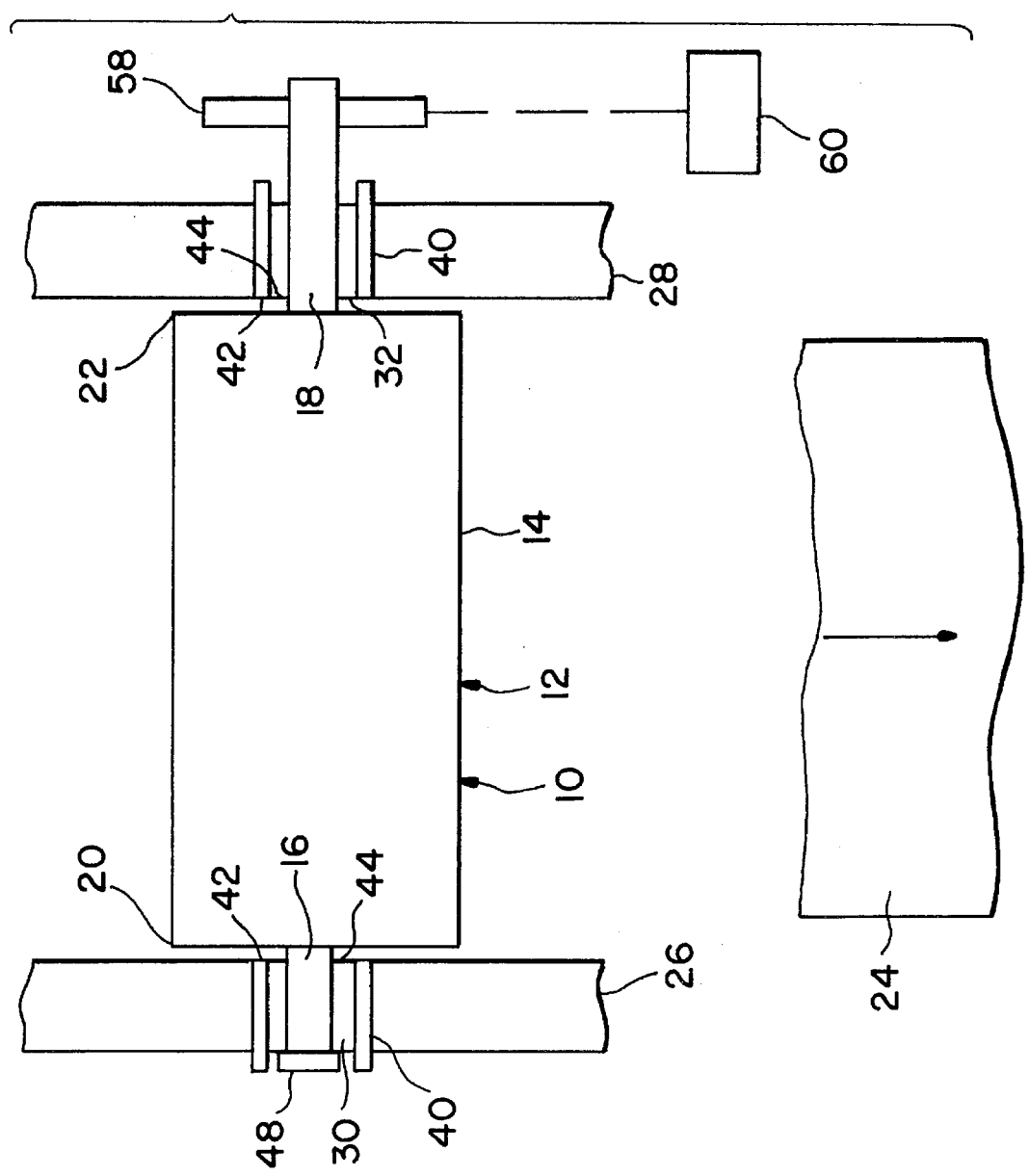

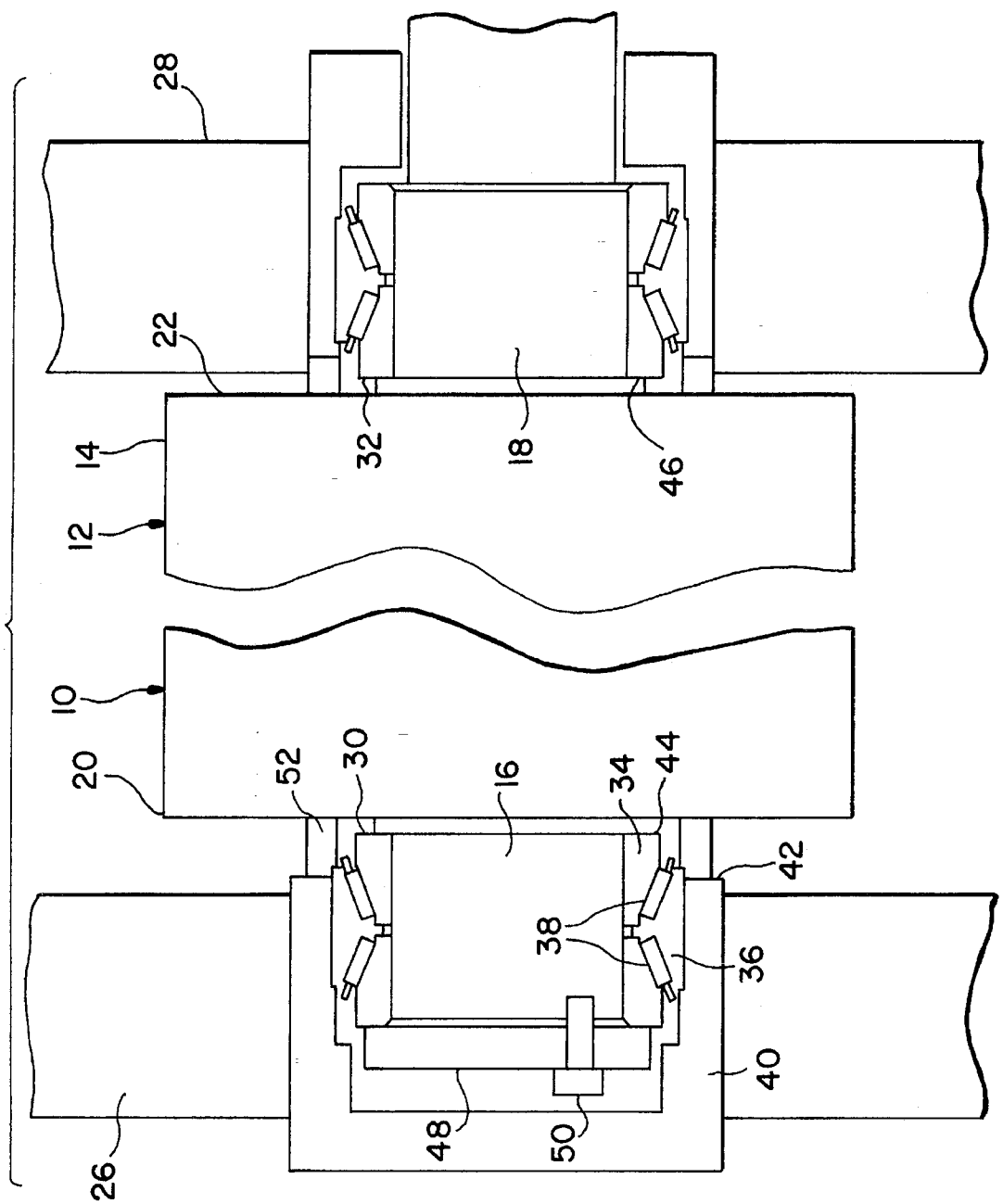

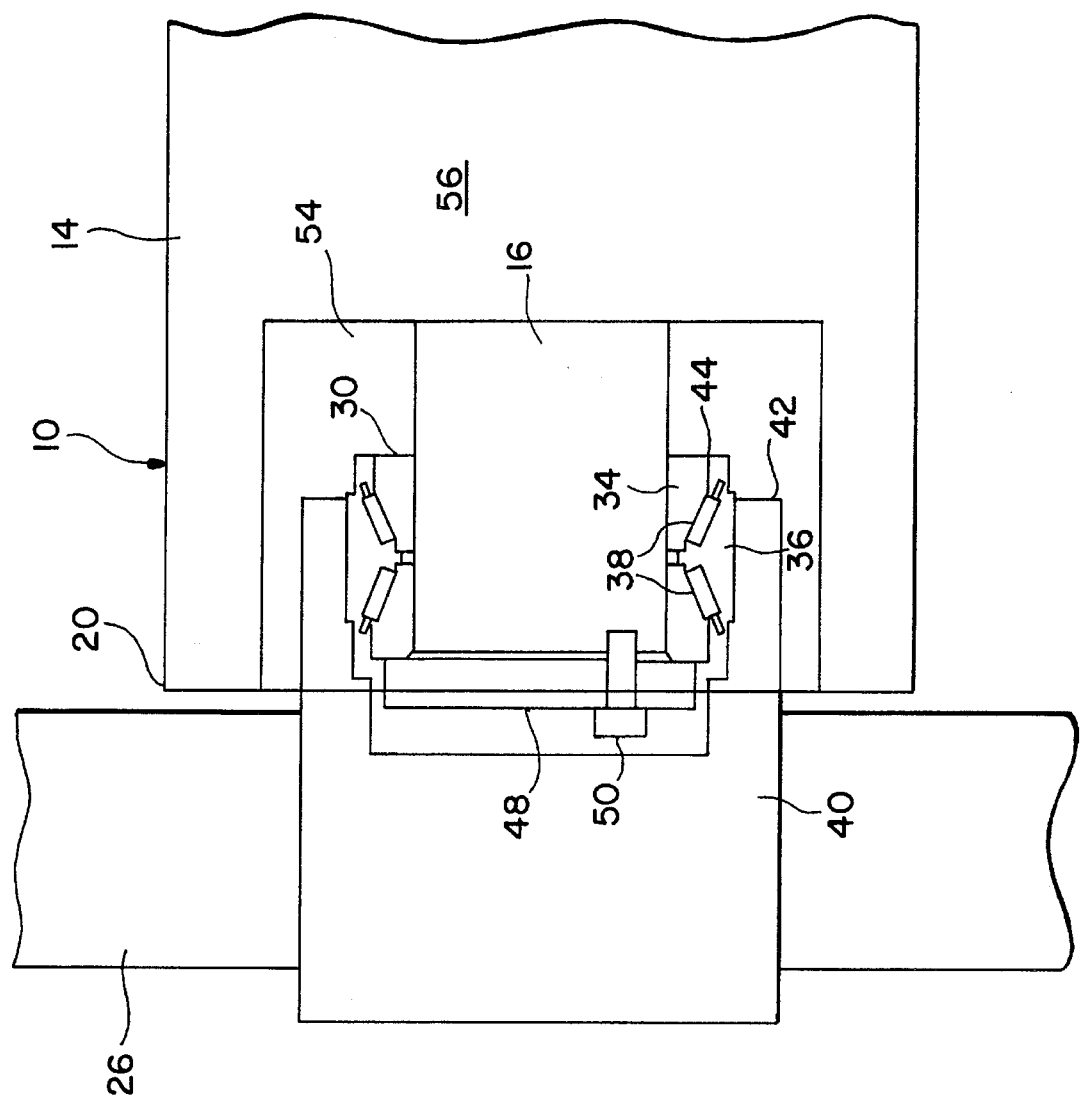

PRINTING DEVICES FOR A PRINTING PRESS

BACKGROUND OF THE INVENTION

The present invention relates to printing devices for a printing press.

In the past, printing cylinders, such as plate and blanket cylinders, have been utilized in printing presses to transfer ink onto a sheet or web of paper in order to form an image on the paper. It has been found, however, that such cylinders are subject to vibration at relatively high operating speeds of the press. Such vibrations result in streaks being formed longitudinally on the paper, and thus the upper speeds of the press have been limited. It has also been found that bearings which support the cylinder during rotation are located too far from an end of the cylinder, such as 2 or 3 inches or further, and they contribute to the undesired vibration of the cylinder while printing by resulting in excessive weakness of the cylinder.

SUMMARY OF THE INVENTION

A principal feature of the present invention is the provision of an improved printing device for a printing press.

The printing device of the present invention comprises, a cylinder having at least one journal extending from an end of the cylinder, and a bearing mounted on the journal.

A feature of the invention is that the bearing has an inner edge located in the range of 1/16 inches to 1½ inches from the end of the cylinder.

Another feature of the invention is that the closely mounted bearing substantially eliminates vibration of the cylinder during operation of the press by increasing the stiffness of the cylinder.

Yet another feature of the invention is that the closely mounted bearing substantially eliminates streaking of the paper printed by the press.

Still another feature of the invention is that the cylinder may be operated at relatively higher press speeds of the press while eliminating streaking on the paper.

Thus, a feature of the invention is that the press may be operated at higher press speeds.

Yet another feature of the invention is that bearings may be mounted on opposed journals of the shaft to produce the same result.

Another feature of the invention is that the device eliminates streaking in a simplified manner.

Still another feature of the invention is that the bearing may be mounted at least partially in a recess inside the end of the cylinder.

A further feature of the invention is that a sleeve or frame member may be utilized in order to provide support for the bearing.

Another feature of the invention is that the device may be utilized on a plate cylinder or blanket cylinder.

Further features will become more fully apparent in the following description of the embodiments of this invention and from the appended claims.

DESCRIPTION OF THE DRAWINGS

In the drawings:

FIG. 1 is a diagrammatic view of a printing device having a cylinder of the present invention;

FIG. 2 is a fragmentary sectional view of the device of FIG. 1; and

FIG. 3 is a fragmentary sectional view of another embodiment of the present invention.

DESCRIPTION OF THE PREFERRED EMBODIMENTS

Referring now to FIG. 1, there is shown a printing device generally designated 10 for a printing press generally designated 12. The printing device 10 has a cylinder or roll 14, such as a blanket cylinder or plate cylinder, having a pair of journals 16 and 18 extending outwardly from opposed ends 20 and 22, respectively, of the cylinder 14. The cylinder 14 is utilized to transfer an image to a paper sheet or web 24 during printing by the press 12. As shown, the device 10 has a pair of opposed bearings or bearing members 30 and 32, respectively, which are mounted on the opposed journals 16 and 18 in order to permit rotation of the cylinder 14. The device 10 may have a pair of frame supports 26 and 28, respectively, in order to support the bearings 30 and 32 during operation of the press. The journal 18 may have a gear 58 driven by a suitable motor 60 in order to rotate the cylinder 14.

Referring to FIG. 2, in one form the bearings 30 and 32 may have an inner race 34 located on the journals 16 and 18, an outer race 36 overlying the inner race 34, and pairs of tapered roller bearings 38 mounted between the inner race 34 and outer race 36, such that the journals 16 and 18 freely rotate in the outer race 36. The device 10 has a pair of hollow sleeves 40 covering the outer race 36 of the bearing 30 and 32 in order to provide support and stability to the bearings 30 and 32. The pair of frame supports 26 and 28 extend approximately to an inner edge 42 of the sleeves 40 and an inner edge 44 and 46 of the bearings 30 and 32, respectively, in order to provide support for the bearings 30 and 32 and the journals 16 and 18 to minimize vibration of the bearings 30 and 32 and the journals 16 and 18, as well as the cylinder 14. The device 10 also has an end plate 48 secured to an outer end of the journals 16 and 18 by suitable threaded bolts 50 in order to lock the bearings 30 and 32 on the respective journals 16 and 18.

In accordance with the present invention, the inner edges 44 and 46, respectively, of the bearings 30 and 32 are spaced a distance from the respective ends 20 and 22 of the cylinder 14 in the range of 1/16 inches to 1½ inches. It has been found that such closely spaced bearings 30 and 32 relative to the cylinder 14 provides rigidity to the cylinder 14 in order to minimize vibrations of the cylinder 14 and eliminate streaking of the paper web 24 during printing. The device 10 of the present invention also permits the press 12 to operate at higher speeds without causing longitudinal streaking of the sheets or web 24. In the past, such bearings were mounted from at least 2 inches to 3 inches from the ends of the cylinder, and frequently the cylinder would bounce and streak particularly at high speeds of the press. Thus, the device 10 of the present invention substantially eliminates such cylinder vibration and resultant streaking on the web.

The device 10 may have sealing rings 52 mounted on the journals 16 and 18 between the bearings 30 and 32 and the cylinder 14 in order to maintain a lubricant in the bearings 30 and 32. In the event that the sealing rings 52 are removed, then the preferred range of the distance between the inner edges 44 and 46 of the bearings 30 and 32 and the ends 20 and 22 of the cylinder 14, respectively, is 0 inches to 1½ inches to minimize vibration of the cylinder 14.

Another embodiment of the present invention is illustrated in FIG. 3, in which like reference numerals designate like parts. In this embodiment, the cylinder 14 has an annular recess 54 in the end 20 of the cylinder 14 in order to form an inner portion 56 of the journal 16 inside the cylinder 14. As shown, the bearing 30 may be wholly mounted inside the cylinder 14 on the journal 16 in order to minimize vibration of the cylinder 14. Alternatively, the inner edge 44 of the bearing 30 may be mounted in the range located at least partially in the grooves 54 to 1½ inches outside the end 20 of the cylinder 14. In other respects, the cylinder of FIG. 3 operates substantially the same as the device 10 previously described in connection with FIGS. 1 and 2 in order to minimize cylinder vibration and streaking of the printed web.

The foregoing detailed description has been given for clearness of understanding only, and no unnecessary limitations should be understood therefrom, as modifications will be obvious to those skilled in the art.

What is claimed is:

1. A printing device for a printing press, comprising:

a cylinder having a journal extending from one end of the cylinder, and an annular groove in the end of the cylinder surrounding the journal such that the groove defines an inner portion of the journal inside the end of the cylinder; and a bearing mounted on the journal and having an inner edge located in the range of at least an inside the groove to 1¾ inches from the end of the cylinder.

2. A printing device for a printing press, comprising:

a cylinder having a journal extending from an end of the cylinder, and having an annular groove defining an inner portion of the journal inside the cylinder; and a bearing member mounted on the journal and having an inner edge located inside the groove of the cylinder.

\* \* \* \* \*